(12) United States Patent
Wenger et al.

(10) Patent No.: US 9,754,507 B1
(45) Date of Patent: Sep. 5, 2017

(54) VIRTUAL/LIVE HYBRID BEHAVIOR TO MITIGATE RANGE AND BEHAVIOR CONSTRAINTS

(71) Applicant: Rockwell Collins, Inc., Cedar Rapids, IA (US)

(72) Inventors: Jason C. Wenger, Cedar Rapids, IA (US); Brian R. Wolford, Cedar Rapids, IA (US); Jaclyn A. Hoke, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 239 days.

(21) Appl. No.: 13/933,870

(22) Filed: Jul. 2, 2013

(51) Int. Cl.
| | |
|---|---|
| *G09G 5/00* | (2006.01) |
| *G09B 19/00* | (2006.01) |
| *G06F 3/01* | (2006.01) |
| *G02B 27/00* | (2006.01) |
| *G02B 27/01* | (2006.01) |
| *G06F 1/16* | (2006.01) |
| *G06T 19/00* | (2011.01) |
| *G06F 3/00* | (2006.01) |
| *G09B 9/00* | (2006.01) |

(52) U.S. Cl.
CPC ............. *G09B 19/00* (2013.01); *G06F 3/011* (2013.01); *G06F 3/013* (2013.01); *G06F 3/017* (2013.01); *A63F 2300/69* (2013.01); *G02B 27/0093* (2013.01); *G02B 27/017* (2013.01); *G02B 2027/014* (2013.01); *G02B 2027/0178* (2013.01); *G06F 1/163* (2013.01); *G06F 3/005* (2013.01); *G06T 19/006* (2013.01); *G09B 9/003* (2013.01)

(58) Field of Classification Search
CPC .......... G06F 3/011; G06F 3/013; G06F 3/017; G06F 3/005; G06F 1/163; G02B 27/017; G02B 2027/014; G02B 2027/0178; G02B 27/0093; G06T 19/006; A63F 2300/69; G09B 9/003
USPC ......... 345/633, 419, 156; 382/104; 359/630; 434/38, 30; 715/757
See application file for complete search history.

(56) References Cited

U.S. PATENT DOCUMENTS

| | | | | |
|---|---|---|---|---|
| 6,166,744 A | * | 12/2000 | Jaszlics | G06T 17/00 345/421 |
| 6,954,498 B1 | * | 10/2005 | Lipton | 375/240.08 |

(Continued)

*Primary Examiner* — Jack Yip
(74) *Attorney, Agent, or Firm* — Angel N. Gerdzhikov; Donna P. Suchy; Daniel M. Barbieri

(57) ABSTRACT

A system and method are disclosed for offering a trainee presentation blending live and virtual entities to create a training scenario unconstrained by live entity operational performance and geographical limitations. The system blends an instance of a virtual entity with an actual presentation of a live entity within a trainee presentation. Outside of trainee local sensor range, the system presents a virtual entity to the trainee while occluding local sensor presentation of the live entity. As the scenario progresses to a lessor range or higher criticality, the system offers the live entity emulation information concerning characteristics of the virtual entity so the live entity may anticipate and begin to emulate the virtual. At a crossover point, the system determines if the live entity has successfully emulated the virtual and if so, discontinues presentation of the virtual while removing the occlusion allowing presentation of the live entity.

20 Claims, 8 Drawing Sheets

(56) References Cited

U.S. PATENT DOCUMENTS

| | | | | |
|---|---|---|---|---|
| 8,190,295 B1* | 5/2012 | Garretson | ............ | G05D 1/0038 |
| | | | | 700/245 |
| 2003/0146922 A1* | 8/2003 | Navab | .................... | G01N 33/84 |
| | | | | 345/633 |
| 2004/0104935 A1* | 6/2004 | Williamson | ............ | G06F 3/012 |
| | | | | 715/757 |
| 2008/0063237 A1* | 3/2008 | Rubenstein | .......... | G06K 9/0063 |
| | | | | 382/103 |
| 2008/0147325 A1* | 6/2008 | Maassel | .................. | G06T 17/05 |
| | | | | 702/5 |
| 2008/0284864 A1* | 11/2008 | Kotake | ................ | G06K 9/3216 |
| | | | | 348/222.1 |
| 2010/0238161 A1* | 9/2010 | Varga et al. | .................... | 345/419 |
| 2011/0171612 A1* | 7/2011 | Gelinske et al. | ............... | 434/35 |
| 2012/0206452 A1* | 8/2012 | Geisner | ................ | G02B 27/017 |
| | | | | 345/419 |
| 2013/0178257 A1* | 7/2013 | Langseth | ................ | G06T 17/05 |
| | | | | 463/4 |
| 2014/0316611 A1* | 10/2014 | Parente Da Silva | . | G06T 19/006 |
| | | | | 701/2 |

\* cited by examiner

VIRTUAL/LIVE HYBRID BEHAVIOR TO MITIGATE RANGE AND BEHAVIOR CONSTRAINTS

FIELD OF THE INVENTION

The present invention relates generally to enhanced training capabilities which enable a live training aid to simulate one unconstrained by range and geographical limitations. More particularly, embodiments of the present invention relate to a system and method for integration of a virtual training aid acting in cooperation and association with the live training aid to offer a realistic training scenario unlimited by the physical and behavior constraints of the live training aid.

BACKGROUND OF THE INVENTION

Traditional training may be accomplished using a live training aid limited by live geographical and performance based constraints. For example, a live training aid aircraft may be used to simulate a hostile threat and perform tactics associated with those of a hostile threat. A trainee may receive information concerning the scenario problem and assess the scenario and tactics thereof. The trainee then makes execution decisions based on the received information. For example, at a distance out of on-board sensor range, a live training aid simulating a hostile threat aircraft may not be a factor to friendly assets associated with the trainee aircraft. At this range, the trainee may only receive information concerning the live training aid via offboard sensors (e.g. datalink).

These live training aids, however, are constrained by physical boundaries making limited the training available to a trainee. For example, live training typically is performed with multiple platforms on a training range. A "range" as used herein may include a fixed, charted geographical section of airspace with 1) a horizontal boundary and 2) a lower vertical boundary and 3) an upper vertical boundary. For example, range airspace may have a an east west limit of 50 Nautical Miles (NM) and a north south limit of 60 NM while encompassing a trapezoidal shape normally associated with a radial/Distance Measuring Equipment (DME) from a Navigational Aid (navaid). This range airspace may exemplarily possess a lower vertical boundary or "floor" of 7000 ft. MSL and an upper vertical boundary "ceiling" of 50,000 ft. MSL.

For example, two aircraft filling a "Blue Air" role practicing friendly tactics while two aircraft filling a "Red Air" role are practicing hostile tactics would oppose each other within such a range. The Red forces presenting a problem against which the Blue Air forces may learn to solve through training. The Red forces are enlisted to provide scenario presentations as training aids for the Blue forces. These scenario presentations require separation between the forces for accuracy and consistency. Occasionally, atmospheric conditions (e.g., strong winds, cloud layers) preclude the Red forces from an accurate or valuable training scenario presentation.

Many high performance aircraft and operational capabilities of weapons systems may exceed the capabilities of a live training aid. For example, modern aircraft require large blocks of airspace both horizontally and vertically due to aircraft speed and altitude capabilities and ranges of ordinance and distances involved. Such large blocks of reserved space are difficult to arrange and finite in geography and suffer from additional limitations including stationary in location, impacted by weather, available at Air Traffic Control discretion, and shared with civilian aircraft. Live training aids may be constrained by service ceiling, maintenance issues and speed limitations limiting an accurate presentation of a high performance threat.

Virtual training aids may solve some of these limitations and provide a limited level of training. Virtual training aids may solve the issue of range but lack the capability for close in visual or local sensor based training. For example, the Blue forces may be presented a scenario in which the Red forces were beyond visual range (BVR) or beyond local sensor range. A BVR scenario may be virtually created and valuable training may occur during prosecution of the virtual training aids. The trainee may make valid operational decisions based on this BVR hostile threat aircraft data received.

However, once the virtual training aid reaches a point where the trainee sensors (radar, targeting pod, pilot's eyeballs) are realistically designed to image the training aid, negative training may result if the trainee's sensors do not successfully image the training aid. For example, at a specific range threshold, an aircraft radar is designed to successfully image a live target aircraft and display the imaged data to the trainee/pilot. Should the radar not image and display the target, the trainee may not receive the desired level of training. Similarly, at closer range, a trainee may expect to visually acquire the training aid and make further decisions based on the visual presentation. A virtual training aid is incapable of producing this actual visual image Therefore, a need remains for training methods and systems which offer a virtual training aid unlimited by physical, geographic and behavior constraints of a live training aid while maintaining a realistic sensor-based problem for the trainee to solve to complete the scenario.

SUMMARY OF THE INVENTION

Accordingly, an embodiment of the present invention is directed to a method for blending an instance of a virtual entity with an actual presentation of a live entity within a trainee presentation, comprising: receiving a training scenario, generating the instance of the virtual entity in compliance with the training scenario, generating the trainee presentation, the trainee presentation including the instance of the virtual entity, the trainee presentation further including an occlusion of the actual presentation of the live entity, communicating the trainee presentation to a trainee, presenting emulation information to an operator of the live entity in compliance with the training scenario, correlating a characteristic of the live entity with a characteristic of the virtual entity, blending, within the trainee presentation, the instance of the virtual entity with the actual presentation of the live entity based on the correlating, removing the virtual entity from the trainee presentation after the blending, removing the occlusion of the actual presentation of the live entity from the trainee presentation after the blending.

An additional embodiment of the present invention includes receiving data associated with presentation of the virtual entity and generating a plurality of virtual entities in compliance with the training scenario.

An additional embodiment of the present invention includes a trainee presentation configured for at least one of: a graphic display, a pictorial display, and a communication of information perceptible by a human, and a trainee presentation configured for presentation on an avionics display onboard a trainee aircraft.

An additional embodiment of the present invention includes presenting information to the live entity to mimic a behavior of the virtual entity and correlating at least one of: a position, an altitude, an airspeed, and a heading of the virtual entity with the live entity.

An additional embodiment of the present invention includes receiving at least one characteristic associated with the live entity and determining if the live entity is within a correlating tolerance and removing the occlusion of the actual presentation of the live entity and discontinuing a presentation of the instance of the virtual entity. Once the live entity is within the correlating tolerance, the method enables an onboard sensor based display of information.

An additional embodiment of the present invention includes a non-transitory computer readable medium having non-transitory computer readable program code embodied therein for blending an instance of a virtual entity with an actual presentation of a live entity within a trainee presentation, the computer readable program code comprising instructions which, when executed by a computer device or processor, perform and direct the steps of: receiving a training scenario, generating the instance of the virtual entity in compliance with the training scenario, generating the trainee presentation, the trainee presentation including the instance of the virtual entity, the trainee presentation further including an occlusion of the actual presentation of the live entity, communicating the trainee presentation to a trainee, presenting emulation information to an operator of the live entity in compliance with the training scenario, correlating a characteristic of the live entity with a characteristic of the virtual entity, blending, within the trainee presentation, the instance of the virtual entity with the actual presentation of the live entity based on the correlating, removing the virtual entity from the trainee presentation after the blending, removing the occlusion of the actual presentation of the live entity from the trainee presentation after the blending.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
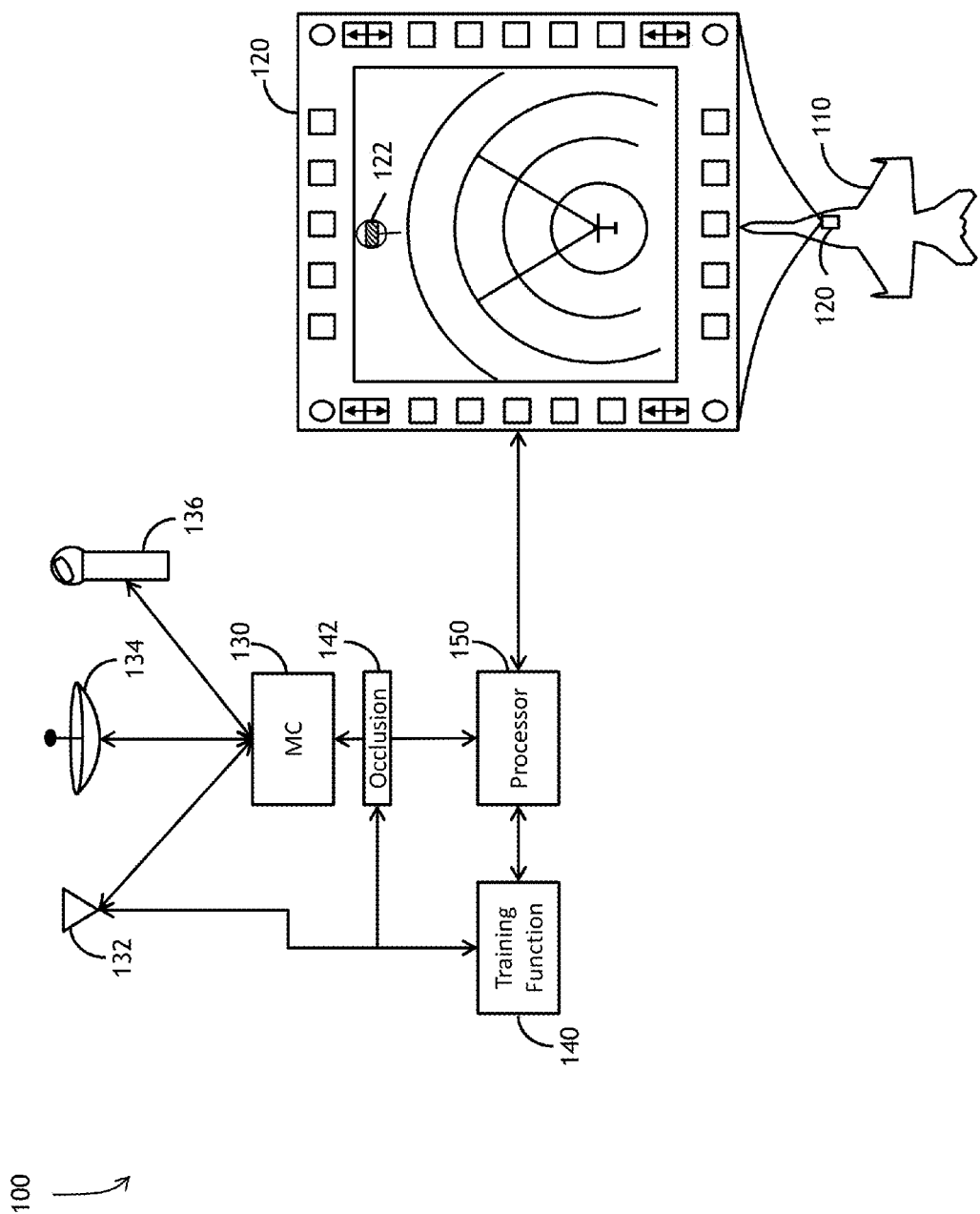
FIG. 1 is a block diagram of a system for blending an instance of a virtual entity with an actual presentation of a live entity within a trainee presentation illustrative of an embodiment of the present invention.

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention are directed to a system and related method for blending an instance of a virtual entity with an actual presentation of a live entity within a trainee presentation. Beyond local trainee sensor range, a trainee is oblivious as to which presentation is before him; the virtual entity or the live entity. As the virtual entity is presented to the trainee, the live entity is occluded from the trainee presentation to simulate characteristics not capable by the live entity and capable by the virtual entity. As the criticality of the training scenario increases, the live entity is offered emulation information to closely emulate characteristics of the virtual entity. Once a desired characteristic of the live entity is within a correlation threshold of the corresponding characteristic of the virtual entity, the virtual entity is no longer presented to the trainee and the live entity is no longer occluded from the trainee presentation. A seamless transition of the trainee presentation from the virtual to the live entity guarantees an accurate training scenario. The live entity continues with the scenario for a realistic training presentation.

It is contemplated herein; embodiments of the present invention may be applicable to a plurality of training scenarios and training methods. One exemplary embodiment of the virtual/live hybrid behavior to mitigate range and behavior constraints may include pilot training in a fighter aircraft. Additional embodiments may include training of an emergency room physician, training of a police officer and training of a ground based operator of a mobile weapons system. The underlying concept remains consistent regardless of the training type or trainee.

A timeline/flow of embodiments disclosed herein may exemplarily include:
1. a live entity is present, but occluded from a trainee presentation/perception;
2. trainee interacts with a virtual entity to solve a problem;
3. trainee perceives the virtual entity decreasing in range/problem threat increases/problem criticality increases;
4. live entity is given characteristic data to emulate virtual entity;

5. if the live entity meets a correlation threshold with the virtual entity, the system blends the entities eliminating the presentation of the virtual entity and removing the occlusion of the live entity from the trainee presentation;
6. trainee interacts with the live entity as a continuation of the problem.

In this manner, a seamless scenario may be presented to the trainee via the trainee presentation. The trainee may make operational decisions based at first on trainee interpretation of characteristics the virtual entity. Secondly, after correlation and blending of the virtual entity with the live entity, the trainee may make decisions based on trainee's interpretation of live entity characteristics received via actual sensors (e.g., visual, tactile, radar, sensor pod, aural, etc.). The scenario may further include the live entity retreating to beyond local sensor capability where the trainee presentation returns to the virtual entity.

Referring to FIG. 1, a block diagram of a system for blending an instance of a virtual entity with an actual presentation of a live entity within a trainee presentation illustrative of an embodiment of the present invention is shown. Trainee presentation 120 resides on board trainee aircraft 110 to communicate with trainee via a visual communications medium. Within trainee presentation 120 an object 122 is presented to the trainee. The origin of object 122 is dependent upon a training scenario within training function 140.

Object 122 may be generated as a virtual entity originating from training function 140 or object 122 may be an actual object originating from one of the aircraft sensors such as data link 132, radar 134 and sensor pod 136 as interpreted by mission computer 130. The origin of object 122 is unknown to the trainee as one goal of a training scenario may include a seamless transition from virtual to live and a possible return to virtual entities effectively presenting a problem for trainee to solve.

Trainee may have access to a variety of sensors. Sensors may include those extensions of human senses onboard the aircraft such as datalink 132, air-to-air radar 134 and sensor pod 136. Mission computer 130 may receive data from the various sensors and process the data for appropriate presentation upon trainee presentation 120. Sensors may further include those human sensors such as vision, tactile and auditory. System 100 may present object 122 in virtual form perceptible to one of the human senses. For example, in FIG. 1 object 122 is presented in visual form configured for a pilot of trainee aircraft 110.

System 100 may present object in virtual form in additional form perceptible by and configured for a human senses. System 100 may present object 122 with characteristics such as a tactile characteristic (e.g., heat, texture, consistency). For example, in a medical training scenario, system 100 may present trainee with a virtual entity associated with a virtual patient. A trainee in this scenario would be required to assess the characteristics of virtual entity 122 and make decisions based on the observed and sensed characteristics.

It is contemplated herein; system 100 may generate additional virtual entities 122 which possess characteristics sensible by a human trainee. For example, system 100 coupled with and controlling a simulator may generate olfactory and gustatory characteristics configured for human perception and thus a potential additional training tool.

One preferable method for system 100 to accurately present trainee presentation 120 is to effectively manage which objects are available to trainee presentation 120. In some scenarios, system 100 may send a virtual entity to trainee presentation 120 and maintain an occlusion 142 of actual objects. In some scenarios, system may send a virtual entity to trainee presentation 122 and allow a partial occlusion of actual objects to most accurately comply with the training scenario. In other instances, system 100 may remove occlusion 142 from the system allowing all actual data to be presented on trainee presentation 120. In this case, system 100 may add virtual entities to trainee presentation 120 to further enhance and complicate the training scenario available to trainee.

Training scenario may reside within training function 140 available to system 100. For example, a trainee pilot may load data to training function 140 via a permission cartridge loader. A well-known Data Transfer Unit (DTU) may provide the data transfer function mobility available from a ground based system to training function 140.

Figure 2:
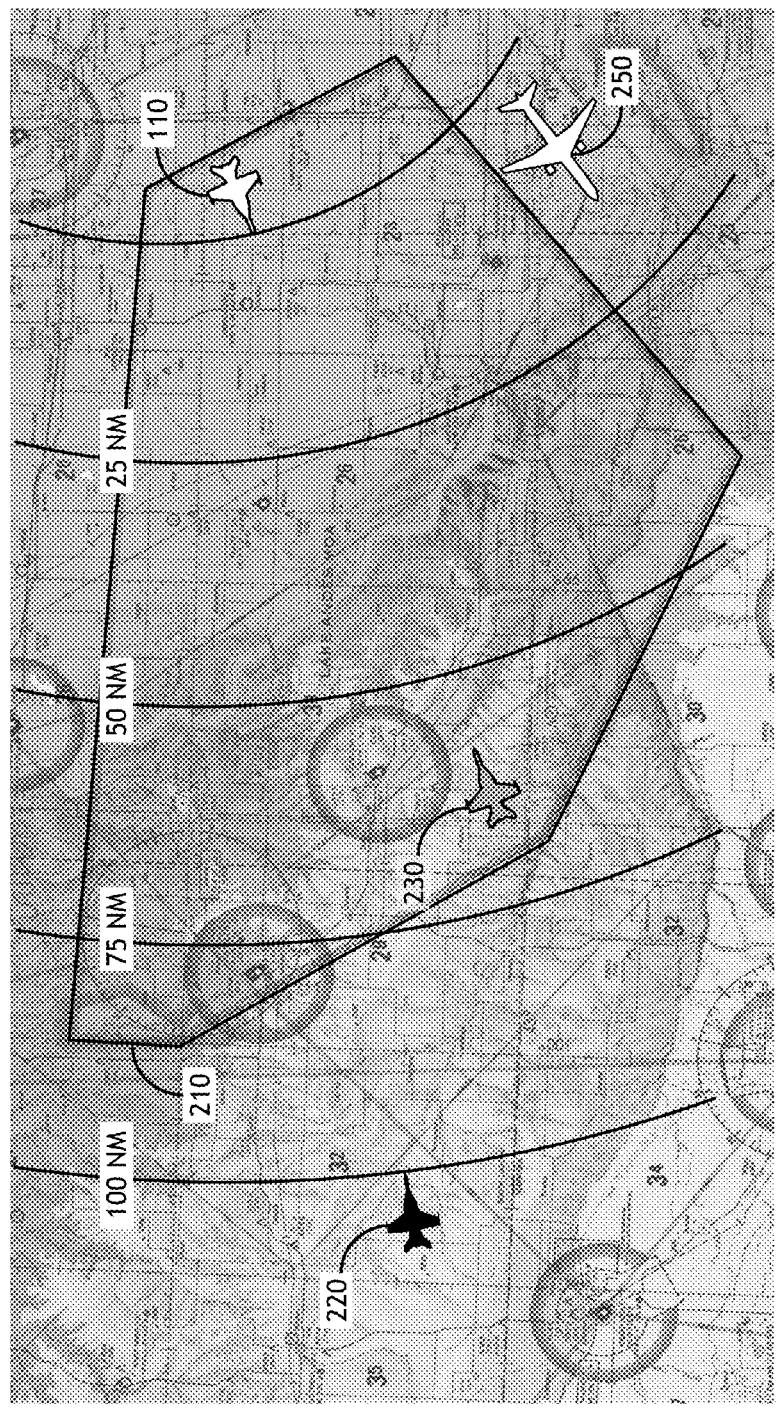
FIG. 2 is a diagram of an exemplary orientation of a trainee aircraft and a training aid illustrative of an embodiment of the present invention.

Referring to FIG. 2, a diagram of an exemplary orientation of a trainee aircraft and a training aid illustrative of an embodiment of the present invention is shown. Trainee aircraft 110 is within the horizontal confines of range 210 along with live training aid 230. Each aircraft is limited to the horizontal confines of the range 210 since additional traffic 250 may be present nearby.

One goal of the present invention may include offering to trainee a trainee presentation 120 unavailable to a training scenario using only live training aids 230. For example, live training aid may be limited to a service ceiling of 25,000 ft. Mean Sea Level (MSL) due to operational or weather issues within range 210. However, the training scenario designed for trainee on board trainee aircraft 110 calls for a presentation of an aircraft at 50,000 ft. MSL and Mach 1.8 at a range of 100 NM from trainee aircraft 110. Live training aid 230 is unable to support this training scenario. System 100 may present trainee with virtual entity 220 to fulfill the portion of the scenario operationally unattainable by live training aid 230.

Figure 3A:
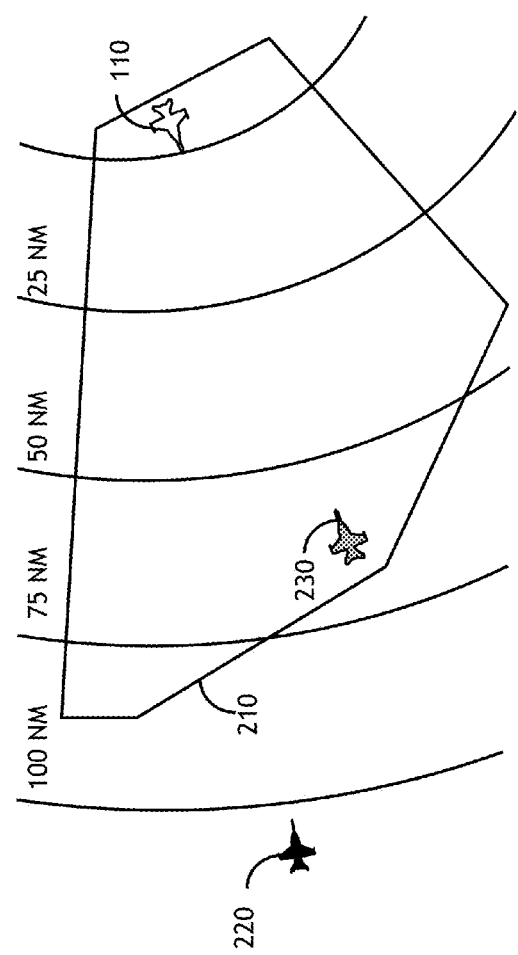
FIGS. 3A and 3B are diagrams of an exemplary progression of a method for blending an instance of a virtual entity with an actual presentation of a live entity within a trainee presentation illustrative of an embodiment of the present invention.
Figure 3B:
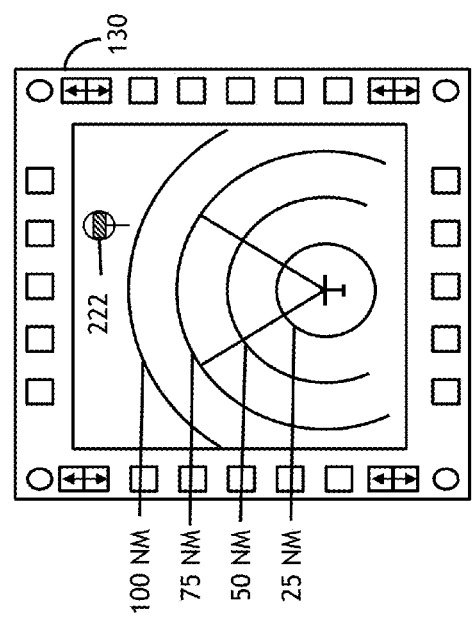

Referring to FIGS. 3A and 3B, diagrams of an exemplary progression of a method for blending an instance of a virtual entity with an actual presentation of a live entity within a trainee presentation illustrative of an embodiment of the present invention are shown. FIG. 3A illustrates an overhead view of a range 210 in which aircraft may operate while FIG. 3B illustrates trainee presentation 120 according to training scenario. System 100 may present to the trainee the trainee presentation 120 comprising virtual entities 220 and live training aids 230. In compliance with the training scenario, system 100 may display only virtual entities 220, a combination of virtual entities 220 and live training aids 230 and only live training aids 230.

As shown in FIG. 3A, actual aircraft present in the range 210 are trainee aircraft 110 and training aid 230. As shown in FIG. 3B, virtual entity 220 is virtual, and displayed on trainee presentation 120 as a contact 222. Live training aid 230 is 70 NM from trainee aircraft 110 but occluded from trainee presentation 120 in compliance with training scenario. Occlusion 142 functions as a block to the raw data information of training aid 230 from reaching trainee display 130. Should a sensor onboard trainee aircraft be able to image live training aid 230, occlusion 142 would block the image data from entering trainee presentation 120. At this point in the training scenario, trainee is aware of only a single contact, 222, at 110 NM from trainee aircraft and trainee assesses the situation and reacts with appropriate blue force tactics.

Figure 4A:
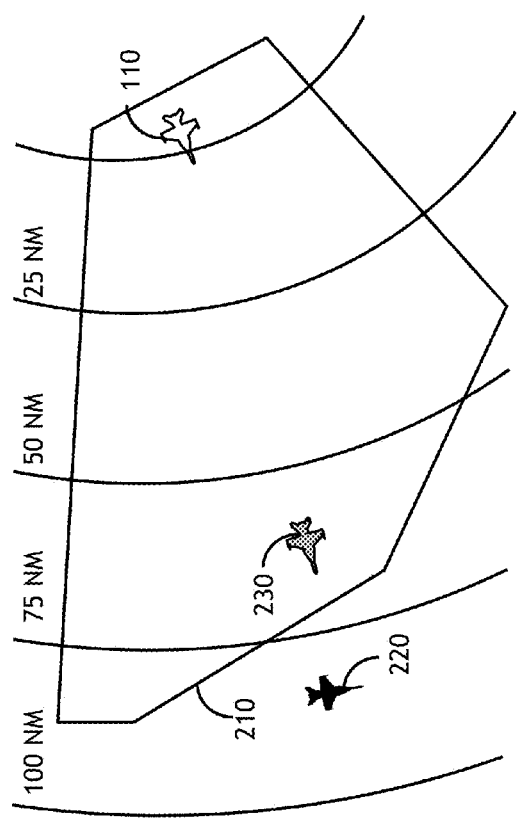
FIGS. 4A and 4B are diagrams of an exemplary progression of a method for blending an instance of a virtual entity with an actual presentation of a live entity within a trainee presentation illustrative of an embodiment of the present invention.
Figure 4B:
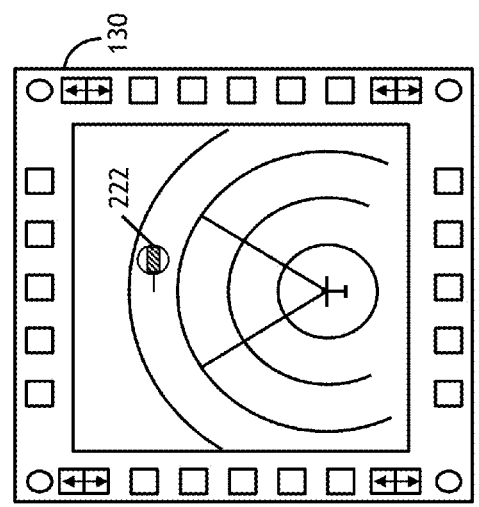

Referring to FIGS. 4A and 4B, diagrams of an exemplary progression of a method for blending an instance of a virtual entity with an actual presentation of a live entity within a trainee presentation illustrative of an embodiment of the present invention are shown. In accordance with training scenario, virtual entity 220 may change a characteristic behavior. For example, system 100 may command virtual entity 220 to maneuver while remaining outside of range 210 boundaries. This maneuver may change a characteristic of virtual entity 220 to more closely align with operational abilities of live training aid 230. For example, virtual entity 220 may turn right 90 degrees, decelerate and descend from 50,000 ft. MSL to 30,000 ft. MSL. As before, trainee presentation 120 may display only virtual entity 220 via contact 222 and trainee remains oblivious to live training aid 230. However, as the scenario progresses, virtual entity 220 may be unable to fulfill the end state role of the training scenario for the trainee.

Should virtual entity 220 be unable to fulfill a portion of the training scenario requirement, system 100 may present emulation information to an operator of the live entity 230 in compliance with the training scenario. For example, one training scenario may begin with a 120 NM presentation and result in a radar rendezvous followed by a visual merge. In this situation, live training aid 230 must emulate virtual entity 220 and must maintain similar characteristics in order for presentation of an accurate training scenario to trainee. System 100 presents emulation information to an operator of live training aid 230 so the operator may manipulate/maneuver live training aid 230 to emulate virtual entity 220.

For example, system 100 may present a pilot of training aid 230 rendezvous information to "join" with virtual entity. In reality, system 100 is providing steering/rendezvous information for operator of live training aid 230 to fly to a point in space. This rendezvous information may be in well-known form of a steering queue, an altitude, heading and airspeed assignment. Preferably, system 100 may offer a visual "fly to" queue to the pilot of training aid 230 to effectively match performance characteristics of virtual entity 220.

Figure 5A:
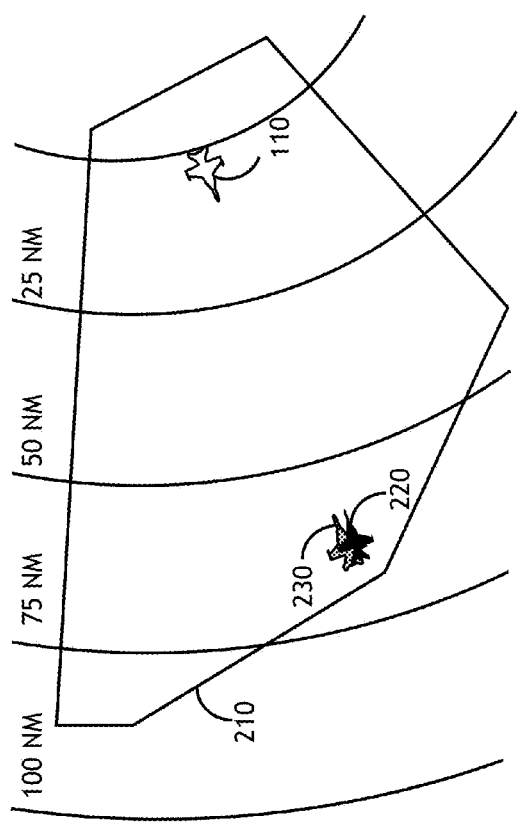
FIGS. 5A and 5B are diagrams of an exemplary progression of a method for blending an instance of a virtual entity with an actual presentation of a live entity within a trainee presentation illustrative of an embodiment of the present invention.
Figure 5B:
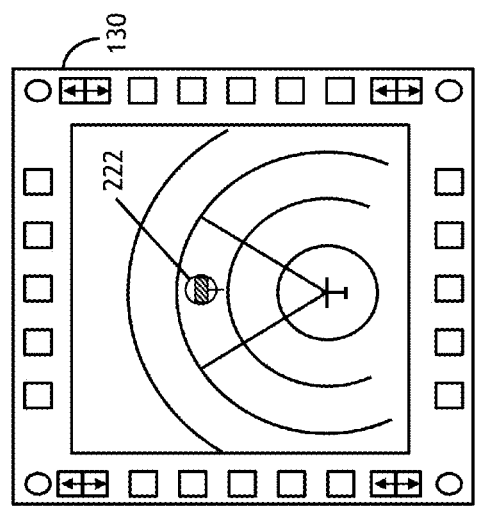

Referring to FIGS. 5A and 5B, diagrams of an exemplary progression of a method for blending an instance of a virtual entity with an actual presentation of a live entity within a trainee presentation illustrative of an embodiment of the present invention are shown. Once live training aid 230 has matched characteristics with virtual entity 220, system 100 blends the instance of the virtual entity with an actual presentation of the live training aid 230 within the trainee presentation 120.

The result will preferably be a seamless transition from virtual entity 220 to live training aid 230 within trainee presentation 120. System 100 may first ensure the characteristics of live training aid 130 are within a correlation tolerance with those of the virtual entity 220. For example, one correlation tolerance may include an altitude of +/−500 ft., airspeed of +/−20 knots, heading of +/−5 degrees, and a lateral position within 1000 ft. Should operator of live training aid 230 fail to match these characteristic within tolerances, system 100 may command a termination or "knock-it-off" of the training scenario and a reset of all assets. Alternatively, should operator of live training aid 230 fail to match these characteristic within tolerances, system 100 may command virtual entity 220 to maneuver and create a second opportunity for live training aid to maneuver to come within the required correlation tolerances.

These correlation tolerances may be rigid or more flexible depending on the required scenario and desired presentation. For example, should live training aid fly to an exact position matching the position characteristic of virtual entity, but arrive 30 knots slow in airspeed, system 100 may allow the successful blending of entities and continue with the training scenario.

As system 100 carries out the blending of the entities, the virtual entity 220 is eliminated from the trainee presentation 120 and the live training aid 230 is presented via a removal of occlusion 142.

System 100 may begin the blending of the entities (live to virtual-virtual to live) as a result of one or more of a plurality of triggers. One such trigger may include a desired range at which a trainee may be presented a problem. For example, a specific air-to-air setup may include a training scenario for blue forces operating against a small Radar Cross Section (RCS) target where trainee ownship sensors may be able to actually sense the target at an exemplary 25 NM. In this training scenario, range from trainee ownship to target may operate as the trigger for system 100 to begin the blending.

In another exemplary embodiment, actions of virtual entity 220 may be the trigger system 100 may use to begin the blend from virtual to live and vice versa. For example, should virtual entity 220 begin a presentation as an unknown, and then take action allowing blue forces to label virtual entity 220 a hostile, the actions of virtual entity 220 may trigger system 100 to begin the blend.

In yet another exemplary embodiment, anticipated visual range may be the trigger for system 100 to begin the blending from virtual entity 220 to live training aid 230. For example, a small fighter sized target may be visible at 15 NM, one possible trigger for system 100 to begin the blending. Additional larger targets or high altitude targets emitting contrails may be visible at a greater range allowing for system 100 to trigger a blend at such range.

In an additional exemplary embodiment, system 100 may receive a training scenario in which blue forces are operating against red forces. Each blue force member (e.g., Blue 1, Blue 2, Blue 3, etc.) may have radar responsibility for coverage of a specific section of airspace. For example, with a cursor coordination range of 20 NM, Blue 1 may be responsible for an altitude coverage of 20,000 ft. and above while Blue 2 may be responsible for 25,000 ft. and below. At a specific pre-briefed point in the scenario, each blue member may discontinue this radar coverage and concentrate on a high threat problem. At this pre-briefed point, the high threat target may be one previously blended. In such a scenario, Blue 1 may have awareness on and be presented a virtual entity 220 blended with a live training aid 230 while Blue 2 may be presented only the live training aid 230 at the pre-briefed point.

In this situation, for Blue 2, both datalink and radar are being occluded 142 offering Blue 2 the desired presentation. At a specific point in the desired scenario, occlusion 142 may be removed for Blue 2 allowing Blue 2 local sensors to present information to Blue 2. Also, fused contacts may be defined as those contacts which more than one sensor (e.g., radar 134, data link 132, sensor pod 136) is sensing and are fused by mission computer 130 into a single contact displayed on trainee presentation 120. A fused contact may be occluded 142 in its entirety. For example, if the target from mission computer 130 is fused from multiple sources, such as being simultaneously communicated on datalink 132 and as a return from a live radar 134, occlusion 142 will occlude all the fused data associated with the target as a set.

Figure 6A:
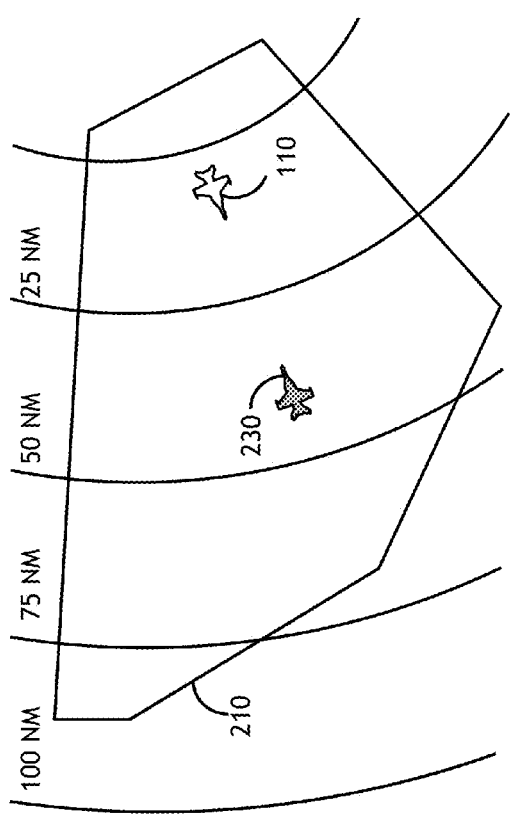
FIGS. 6A and 6B are diagrams of an exemplary progression of a method for blending an instance of a virtual entity with an actual presentation of a live entity within a trainee presentation illustrative of an embodiment of the present invention.
Figure 6B:
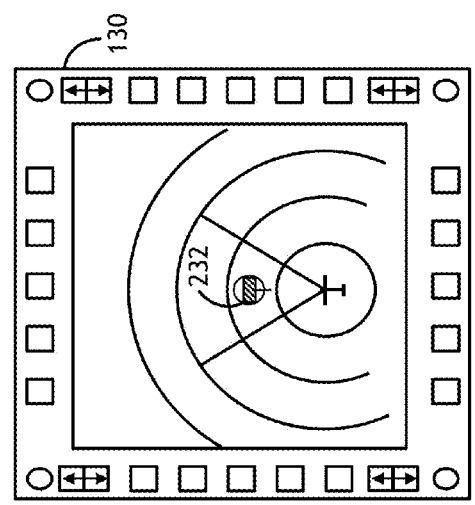

Referring to FIGS. 6A and 6B, diagrams of an exemplary progression of a method for blending an instance of a virtual entity with an actual presentation of a live entity within a trainee presentation illustrative of an embodiment of the present invention are shown. In FIGS. 6A and 6B, system 100 has removed both the virtual entity 220 and occlusion 142 allowing local sensors onboard trainee aircraft 110 to image live training aid display live contact 232 on trainee display 130.

Figure 7:
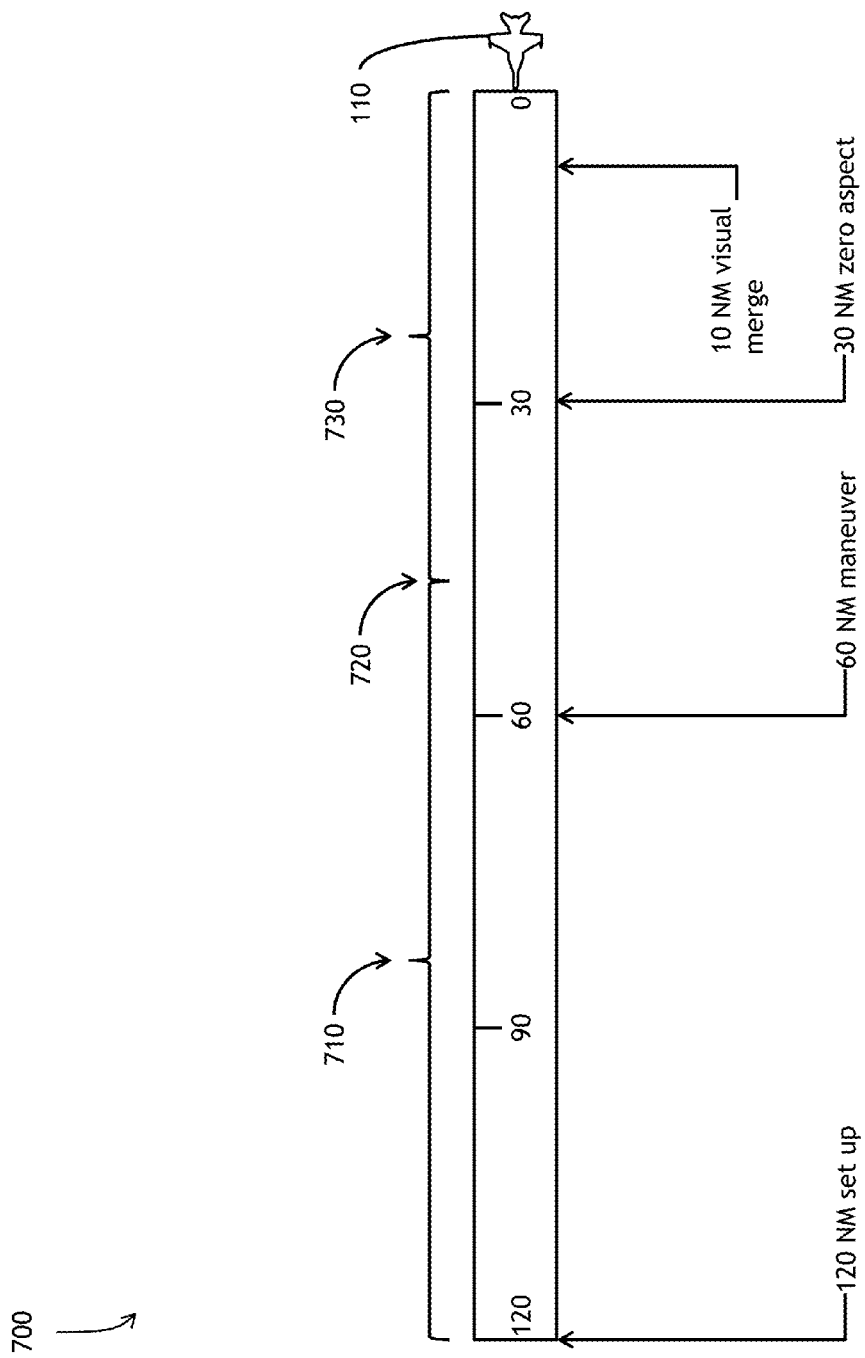
FIG. 7 is a timeline of an exemplary merge progression in a training scenario in accordance with an embodiment of the present invention.

Referring to FIG. 7, a timeline of an exemplary merge progression in a training scenario in accordance with an embodiment of the present invention is shown. At 120 NM from trainee aircraft 110, the training scenario may begin with a display 710 of virtual entity 220. A maneuver at 60 NM continues the scenario with virtual entity 220 maneuvering in altitude and airspeed. At approximately 45 NM, system 100 blends 720 the presentation of the virtual entity with the presentation of the live training aid 230. Within 45 NM, the trainee presentation 120 is limited to the display 730 of live training aid 230. At 30 NM the aircraft are nose to nose with zero aspect and a visual merge may begin at 10 NM.

Figure 8:
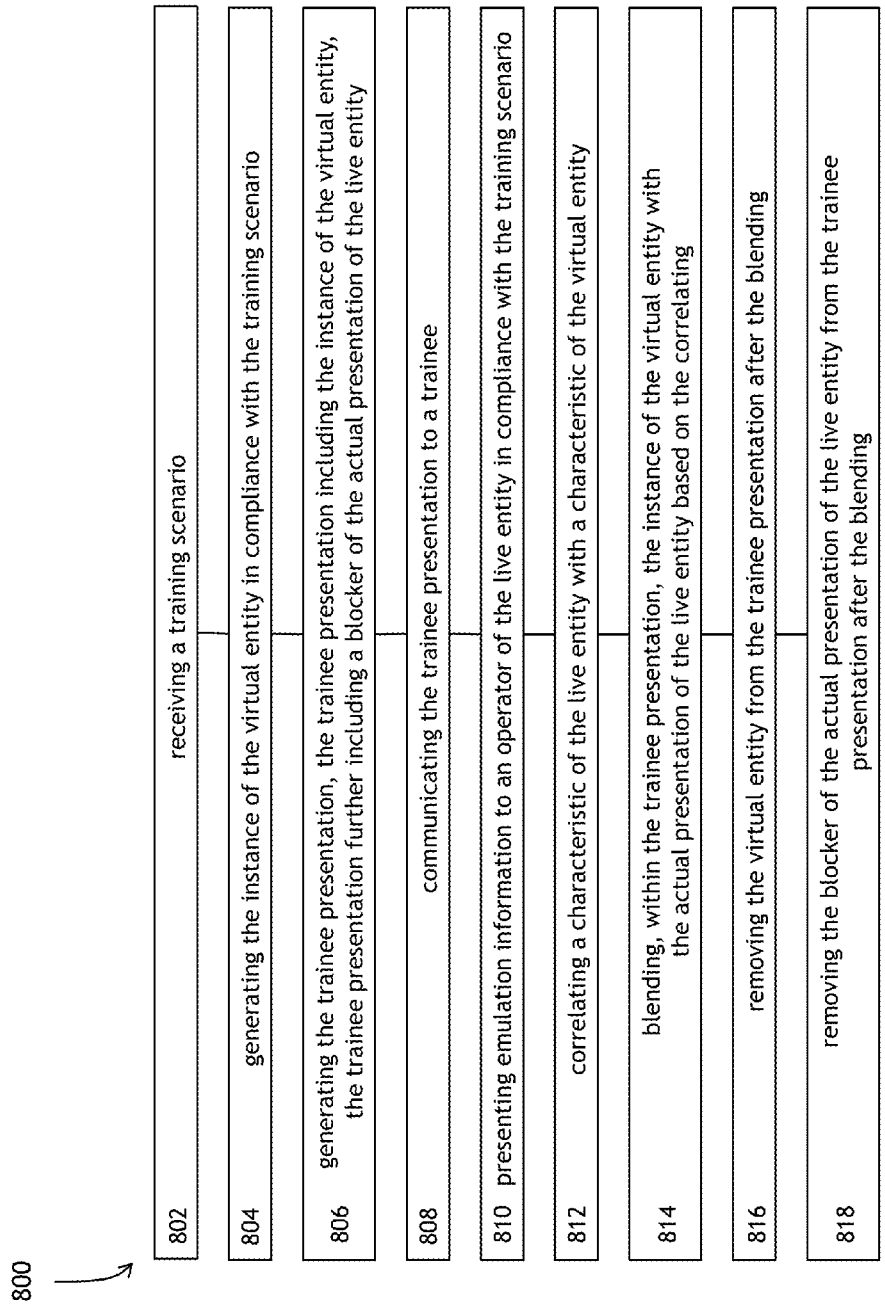
FIG. 8 is a flow diagram for a method for blending an instance of a virtual entity with an actual presentation of a live entity within a trainee presentation.

Referring to FIG. 8, a flow diagram for a method for blending an instance of a virtual entity with an actual presentation of a live entity within a trainee presentation is shown. Method 800 begins at step 802 with receiving a training scenario, and, at step 804, generating the instance of the virtual entity in compliance with the training scenario, and, at step 806, generating the trainee presentation, the trainee presentation including the instance of the virtual entity, the trainee presentation further including an occlusion of the actual presentation of the live entity, and, at step 808 communicating the trainee presentation to a trainee. Method 800 continues at step 810 with presenting emulation information to an operator of the live entity in compliance with the training scenario, and, at step 812 correlating a characteristic of the live entity with a characteristic of the virtual entity, and, at step 814 blending, within the trainee presentation, the instance of the virtual entity with the actual presentation of the live entity based on the correlating, and, at step 816 removing the virtual entity from the trainee presentation after the blending, and, at step 818 removing the occlusion of the actual presentation of the live entity from the trainee presentation after the blending.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for blending an instance of a virtual entity with an actual presentation of a live entity within an aircraft flight trainee presentation, comprising:
   receiving a training scenario having a defined fixed range that limits an ability of a trainee aircraft or its instrumentation;
   generating the instance of the virtual entity in compliance with the training scenario;
   generating the trainee presentation, the trainee presentation including the instance of the virtual entity, the trainee presentation further including an occlusion of the actual presentation of the live entity, wherein including the instance of the virtual entity and including the occlusion of the actual presentation of the live entity are independent of the defined range;
   communicating the trainee presentation to a trainee via at least one of: a graphic display and a pictorial display;
   presenting emulation information to an operator of the live entity in compliance with the training scenario to mimic a behavior of the virtual entity;
   correlating a characteristic of the live entity with a characteristic of the virtual entity;
   blending, within the trainee presentation, the instance of the virtual entity with the actual presentation of the live entity based on the correlating;
   removing the virtual entity from the trainee presentation; and
   removing the occlusion of the actual presentation of the live entity from the trainee presentation, wherein the removing the virtual entity and the removing the occlusion occur as a result of the blending, the virtual entity being within the defined range, and as a result of the live entity being within a correlating tolerance.

2. The method for blending an instance of a virtual entity with an actual presentation of a live entity within a trainee presentation of claim 1, wherein the defined range is a first defined range, wherein receiving a training scenario having the defined range further includes receiving data associated with presentation of the virtual entity on a display that presents training data according to a second defined range, the second defined range being greater than the first defined range, and wherein the first defined range is a charted geographical section of airspace and the second defined range is at least one of: outside the charted geographical section of airspace, beyond visual range (BVR) of the trainee aircraft, and beyond local sensor range of the trainee aircraft.

3. The method for blending an instance of a virtual entity with an actual presentation of a live entity within a trainee presentation of claim 1, wherein generating the instance of the virtual entity further comprises generating a plurality of virtual entities in compliance with the training scenario.

4. The method for blending an instance of a virtual entity with an actual presentation of a live entity within a trainee presentation of claim 1, wherein the trainee presentation is configured for presentation on an avionics display onboard the trainee aircraft.

5. The method for blending an instance of a virtual entity with an actual presentation of a live entity within a trainee presentation of claim 1, further comprising:
   returning the virtual entity and the occlusion to the trainee presentation when at least one of: the virtual entity is outside the defined range and the live entity being is not within the correlating tolerance.

6. The method for blending an instance of a virtual entity with an actual presentation of a live entity within a trainee presentation of claim 1, wherein correlating a characteristic of the live entity with a characteristic of the virtual entity further comprises correlating at least one of: a position, an altitude, an airspeed, and a heading of the virtual entity with the live entity.

7. The method for blending an instance of a virtual entity with an actual presentation of a live entity within a trainee presentation of claim 1, wherein correlating a characteristic of the live entity with a characteristic of the virtual entity further comprises receiving at least one characteristic associated with the live entity, comparing the at least one characteristic associated with the live entity to a similar characteristic of the virtual entity, and determining if the live entity is within the correlating tolerance.

8. The method for blending an instance of a virtual entity with an actual presentation of a live entity within a trainee presentation of claim 1, wherein blending, within the trainee presentation, the instance of the virtual entity with the actual presentation of the live entity further comprises removing the occlusion of the actual presentation of the live entity and discontinuing a presentation of the instance of the virtual entity, thereby replacing the discontinued presentation of the instance of the virtual entity with the actual presentation of the live entity.

9. The method for blending an instance of a virtual entity with an actual presentation of a live entity within a trainee presentation of claim 1, wherein removing the occlusion of the actual presentation of the live entity from the trainee presentation further comprises enabling an onboard sensor based display of information when the virtual entity is within the defined range and the live entity is within the correlating tolerance.

10. A non-transitory computer readable medium having non-transitory computer readable program code embodied therein for blending an instance of a virtual entity with an actual presentation of a live entity within an aircraft trainee presentation, the computer readable program code comprising instructions which, when executed by a computer device or processor, perform and direct the steps of:
receiving a training scenario having a defined fixed range;
generating the instance of the virtual entity in compliance with the training scenario;
generating the trainee presentation, the trainee presentation including the instance of the virtual entity, the trainee presentation further including an occlusion of the actual presentation of the live entity, wherein including the instance of the virtual entity and including the occlusion of the actual presentation of the live entity are independent of the defined range;
communicating the trainee presentation to a trainee via at least one of: a graphic display and a pictorial display;
presenting emulation information to an operator of the live entity in compliance with the training scenario to enable the live entity to rendezvous or to join with the virtual entity;
correlating a characteristic of the live entity with a characteristic of the virtual entity;
blending, within the trainee presentation, the instance of the virtual entity with the actual presentation of the live entity based on the correlating;
removing the virtual entity from the trainee presentation; and
removing the occlusion of the actual presentation of the live entity from the trainee presentation, wherein the removing the virtual entity and the removing the occlusion occur as a result of the blending, the virtual entity being within the defined range, and as a result of the live entity being within a correlating tolerance.

11. The non-transitory computer readable medium of claim 10, wherein the defined range is a first defined range that limits an ability of a trainee aircraft or its instrumentation, and wherein receiving a training scenario having the defined range further includes receiving data associated with presentation of the virtual entity on a display that presents training data according to a second defined range, the second defined range being greater than the first defined range, and wherein the first defined range is a charted geographical section of airspace and the second defined range is at least one of: outside the charted geographical section of airspace, beyond visual range (BVR) of the trainee aircraft, and beyond local sensor range of the trainee aircraft.

12. The non-transitory computer readable medium of claim 10, wherein generating the instance of the virtual entity further comprises generating a plurality of virtual entities in compliance with the training scenario.

13. The non-transitory computer readable medium of claim 10, wherein the trainee presentation is configured for presentation on an avionics display onboard a trainee aircraft.

14. The non-transitory computer readable medium of claim 10, wherein presenting emulation information to an operator of the live entity to enable the live entity to rendezvous or to join with the virtual entity further comprises presenting information to the live entity to mimic a behavior of the virtual entity.

15. The non-transitory computer readable medium of claim 10, wherein correlating a characteristic of the live entity with a characteristic of the virtual entity further comprises correlating at least one of: a position, an altitude, an airspeed, and a heading of the virtual entity with the live entity.

16. The non-transitory computer readable medium of claim 10, wherein correlating a characteristic of the live entity with a characteristic of the virtual entity further comprises receiving at least two characteristics associated with the live entity, comparing the at least two characteristics to two similar characteristics of the virtual entity, and determining if the live entity is within the correlating tolerance, the correlating tolerance including a tolerance for each of the at least two characteristics, and wherein the tolerance for one characteristic of the at least two characteristics is more flexible than the other tolerance.

17. The non-transitory computer readable medium of claim 10, wherein blending, within the trainee presentation, the instance of the virtual entity with the actual presentation of the live entity further comprises removing the occlusion of the actual presentation of the live entity and discontinuing a presentation of the instance of the virtual entity, thereby replacing the discontinued presentation of the instance of the virtual entity with the actual presentation of the live entity.

18. The non-transitory computer readable medium of claim 10, wherein removing the occlusion of the actual presentation of the live entity from the trainee presentation further comprises enabling an onboard sensor based display of information when the virtual entity is within the defined range and the live entity is within the correlating tolerance.

19. The method for blending an instance of a virtual entity with an actual presentation of a live entity within a trainee presentation of claim 1, wherein presenting emulation information to an operator of the live entity in compliance with the training scenario further comprises presenting flight plan, flight directive, or flight vector information to the operator to mimic a behavior of the virtual entity.

20. The method for blending an instance of a virtual entity with an actual presentation of a live entity within a trainee presentation of claim 19, wherein blending, within the trainee presentation, the instance of the virtual entity with the actual presentation of the live entity based on the correlating further comprises blending based on a determination of compliance with the flight plan, flight directive, or flight vector information.

\* \* \* \* \*